United States Patent [19]
Kartchner

[11] Patent Number: 6,077,400
[45] Date of Patent: *Jun. 20, 2000

[54] RADIO FREQUENCY MICROWAVE ENERGY METHOD TO BREAK OIL AND WATER EMULSIONS

[75] Inventor: Henry H. Kartchner, Houston, Tex.

[73] Assignee: Imperial Petroleum Recovery Corp., Houston, Tex.

[ * ] Notice: This patent is subject to a terminal disclaimer.

[21] Appl. No.: 09/295,565

[22] Filed: Apr. 21, 1999

Related U.S. Application Data

[63] Continuation of application No. 08/936,063, Sep. 23, 1997, Pat. No. 5,914,014.

[51] Int. Cl.7 .............................. C07C 1/00; B01D 17/06
[52] U.S. Cl. ...................... 204/157.15; 210/748; 44/904
[58] Field of Search ................. 204/157.15; 210/748; 44/904

[56] References Cited

U.S. PATENT DOCUMENTS

| | | | |
|---|---|---|---|
| 4,067,683 | 1/1978 | Klaila | 431/11 |
| 4,193,448 | 3/1980 | Jeambey | 166/60 |
| 4,853,119 | 8/1989 | Wolf et al. | 210/181 |
| 5,914,014 | 6/1999 | Kartchner | 204/157.15 |

FOREIGN PATENT DOCUMENTS

| | | |
|---|---|---|
| 0327439 | 8/1989 | European Pat. Off. . |
| 19505615 | 8/1996 | Germany . |
| WO 85/04893 | 11/1985 | WIPO . |
| WO 94/26844 | 11/1994 | WIPO . |

*Primary Examiner*—Kathryn Gorgos
*Assistant Examiner*—Edna Wong
*Attorney, Agent, or Firm*—Jenkens & Gilchrist, P.C.

[57] ABSTRACT

A method to effectively break hydrocarbon and water emulsions with radio frequency energy. A stream of hydrocarbon and water emulsion is pumped into a multimode resonant reentrant microwave cavity. Dual opposing emulsion flow chambers with a centrally supplied microwave waveguide form a double ended resonant chamber with multiple RF energy reflections to effectively treat the flowing emulsion. The emulsified feedstock enters into the bottoms of both flow chambers and exits to a centrifuge or storage for separation.

11 Claims, 4 Drawing Sheets

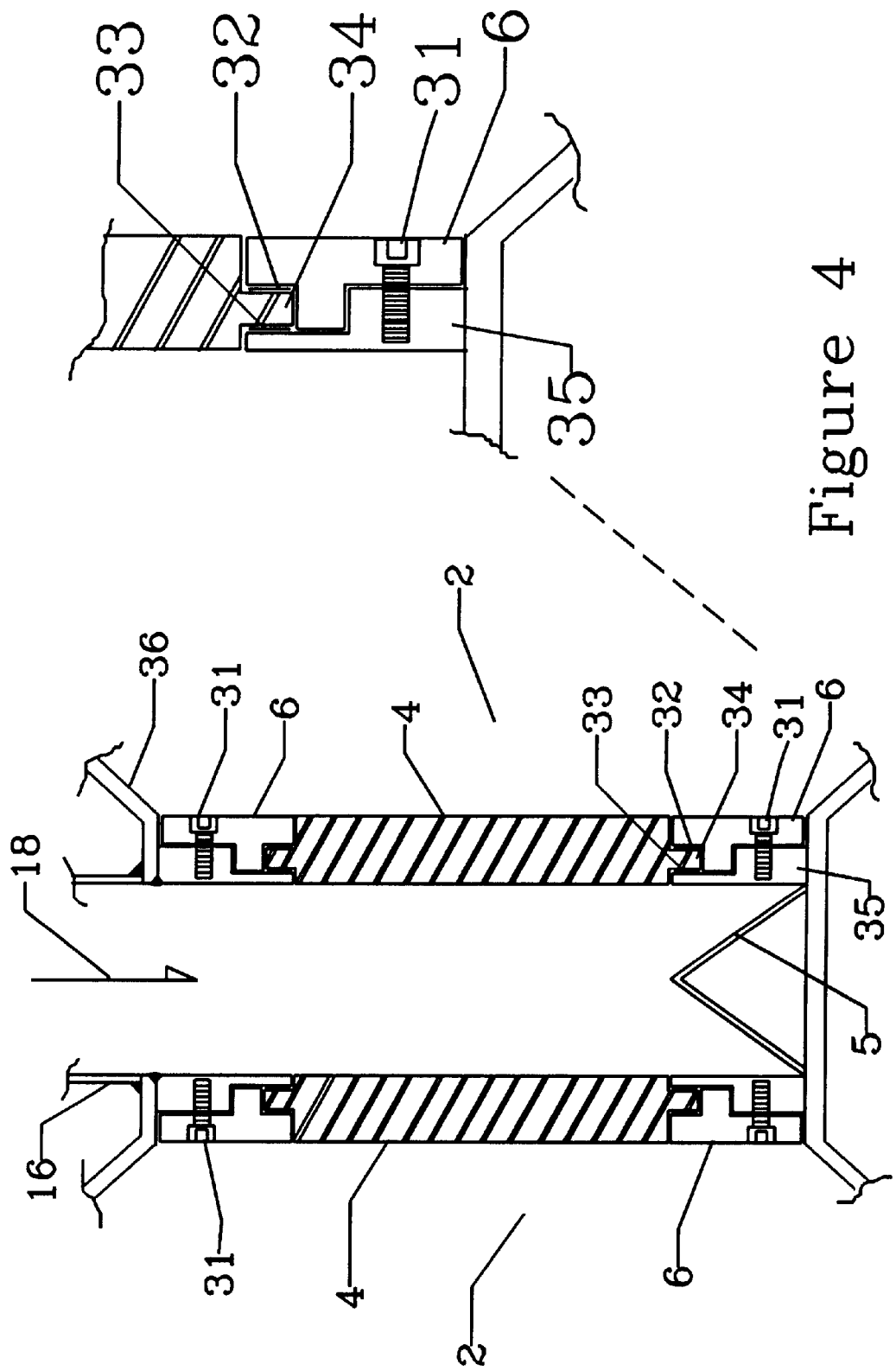

RADIO FREQUENCY MICROWAVE ENERGY METHOD TO BREAK OIL AND WATER EMULSIONS

CROSS REFERENCE TO OTHER APPLICATIONS

This application is a Continuation of U.S. application Ser. No. 08/936,063, filed Sep. 23, 1997, now U.S. Pat. No. 5,914,014 and made reference herein.

BACKGROUND OF THE INVENTION

In the refining industry every attempt is made to extract the maximum usable petrochemical product from the crude oil retrieved from deep within the earth or underseas. It would be fortunate to have a pure sweet product emerge, but this is very seldom the case. More often than not, the crude oil emerges partly as an emulsified mixture of oils, waxes, tars, salt and mineral laden water, fine sands and mineral particulates. Upon storage at the well and refinery sites, some natural settling and stratification occurs, but an intractable emulsion of oil and water and flocculate minerals remains to be dealt with. This waste or slop oil remains as a substantial environmental detriment and represent lost income from recoverable refinery feedstock. Among the many chemical and physical separation techniques, those that act to separate oil molecules from water molecules at their boundary interface with economy serve the oil recovery industry best.

Physical separation techniques employ conductive heating to reduce surface tension at the oil and water boundary interface and centrifuging to separate the less dense oil from water. In those situations in which the oil contains a large number of polar molecules with a hydrophilic (water loving) end and a hydrophobic (water hating) end, reduction of surface tension by direct heating alone will not suffice. And under those conditions in which complex organic compounds increase the density of the oil fraction to nearly that of water, the centrifuge relying on the difference in component densities, will fail to completely separate the components.

Chemical additives used as emulsion breakers often present an economic burden and additional contaminated water disposal problem. In most situations a combination of physical and chemical means are required.

Laboratory and field tests have proven that the application of radio frequency (RF) microwave energy to oil-water emulsions will result in separation at the molecular level to an advantage over other methods. It is believed that the oil-water interface bond is broken as the RF energy agitates the water molecule, a highly polar molecule that spins and twists rapidly in the oscillating radio frequency field. In a similar fashion, the hydrophilic polar end of the oil binding molecules are vibrated most by the radio frequency field. This shearing effect aids in the coalescence of oil droplets separated from the water droplets and the ultimate breaking of the emulsion. The vibration at the polar interface creates localized heating to further aid the separation of the constituents.

The present invention details an apparatus designed to effectively apply microwave radio frequency energy to a pumped stream of hydrocarbon and water emulsion with the maximum absorption of the radio frequency energy in a multimode resonant reentrant microwave cavity. Dual opposing emulsion flow chambers with a centrally supplied microwave waveguide form a double ended resonant chamber with multiple RF energy reflections to effectively treat the flowing emulsion. The emulsified feedstock enters into the bottoms of both flow chambers and exits from the top having been heated by and treated with microwave radio frequency energy.

DESCRIPTION OF THE PRIOR ART

In U.S. Pat. No. 4,067,683 William J. Klaila teaches a method of electromagnetically heating a high viscosity hydrocarbon fluid for controlling its fluency by using a pyramidal shaped horn composed of a dielectric material that converges inwardly into a oil burner fuel tank. Similar pyramidally and conically shaped radio frequency applicators are directed down a pipe into viscous oil bearing geological structures to heat the oil in situ. This patent, issued in Jan. 10, 1978, makes no claim or reference to the breaking of oil-water emulsions.

Leslie E. Compton, in U.S. Pat. No. 4,174,751 does not use Radio frequency energy to extract "shale oil" in situ. A cursory mention of "electrostatic" method of separation is made in the specification, but is not further elaborated upon. The application of radio frequency energy is not mentioned.

Chalmer G. Kirkbride in U.S. Pat. No. 4,279,722 describes improved catalytic reactions in petroleum refining by subjecting the hydrocarbon reactants in contact with catalytic materials to the influence of wave energy in the microwave range. He does not teach a method or apparatus to apply the radio frequency microwave energy. The patent claims improved efficiency in converting hydrocarbons to other hydrocarbons with radio frequency energy in catalytic processes but the radio frequency energy is not used to break emulsions.

In "Microwave Demulsification," C. S. Fang, Bruce K. L. Chang and Peter M. C. Lai, Department of Chemical Engineering, University of Southwestern Louisiana, Lafayette, La., 70504 and W. J. Klaila, Electromagnetic Energy Corporation, Middleboro, Mass., 02346 in the publication Chemical Engineering Comm. 1988, Vol 73, pp. 227–239, complete some basic laboratory experiments to show that demulsification of oil and water by microwave energy substantially improves separation levels and times. Field tests consisted of directing microwave energy from a 20 KW microwave generator with a cone shaped applicator centered and facing downward in a 10 foot high by 10 foot diameter cylindrical metal tank. The contents of the tank were shown to separate after several hours of radio frequency energy application. This is a batch process, not a flow through process.

Nicolas Wolf, in U.S. Pat. No. 4,582,629 claims a method for enhancing the separation of hydrocarbon and water from an emulsion or dispersion with the application of microwave energy and then heating the emulsion using conventional heating means. Particular means to apply the microwave energy are not described or claimed.

In U.S. Pat. No. 4,810,375, Roger L. Hudgins [and Wolf] et al., treats an oil-water emulsion with a system comprising a microwave energy source and an applicator having an inlet and an outlet for the passage of oil-water emulsion or dispersion without detailed reference to the nature of the microwave applicator. Claims pertain to the use of water separated from the emulsion to flow through and cool a water filled dummy load chamber to absorb reflected microwave energy.

In U.S. Pat. No. 4,853,119, Wolf et al. describes a coalescer medium contained within the microwave applicator to improve the separation of the emulsion components.

In Samardzija U.S. Pat. No. 4,853,507 describes an apparatus for efficient heating of microwave of emulsions or dispersions having a section of waveguide with a tapered impedance matching membrane formed from low dielectric material to best present impedance matching surface into a liquid filled end of the radio frequency wave guide section. Several other applicator shapes are described in specification and claims for both circular and rectangular waveguides.

In U.S. Pat. No. 4,855,695 Samardzija the microwave energy delivered to the de-emulsifier system is tuned to an optimum voltage standing wave ratio by means of a computerized phase shifter.

Unlike prior art, the preferred embodiment of this invention describes a radio frequency energy applicator that reflects energy into dual opposed radio frequency terminal cavities by means of angled reflector plates located at the terminal end of a rectangular waveguide. Low loss, radio frequency transparent, flat plate windows prevent the intrusion of chemical feedstock into the waveguide. Feedstock flow is upward against gravity to prevent entrained solids from becoming trapped within the resonator cavities. The dual opposed radio frequency terminal cavities act as one multimode resonant reentrant microwave cavity to effectively absorb microwave energy. The reentrant chamber dimensions closely match the microwave standing wave patterns, given the dielectric nature of the oil and water mixture flowing through the dual opposed cavities.

The waveguide terminal reflector plates are sized and angled to minimize radio frequency losses and to prevent reflected energy from returning to and damaging the radio frequency transmitter. A three port circulator is placed within the transmission path between the transmitter and the microwave applicator to divert any reflected radio frequency to a water cooled dummy load.

In addition, the applicant has made improvements in the method of treating emulsions to aid in their separation and in the apparatus used to apply radio frequency microwave energy to the emulsion feedstock. The inventor recognizes the need first to conventionally preheat the feedstock to melt solids such as waxes and tars to raise their level of dielectric absorption of microwaves prior to treatment with microwaves and to improve feedstock pumping characteristics by lowering viscosity.

The inlet and outlet temperatures are monitored and the flow rate of the feedstock is controlled to maintain optimal dwell time and exit temperature to guarantee the best separation of emulsion components. An optimum temperature differential of the feedstock between the inlets and outlets of the microwave cavities is fed back to the pump feed rate controller. Pumping rate is changed to maintain the proper temperature difference for optimum emulsion breaking. The inventor finds this method preferable over those methods using adjustments in the voltage standing wave ratio (VSWR) to control the feedstock pumping rate.

The inlet is located below outlet to flush out particulate solids such as sand and prevent the trapping of sand and the concomitant loss of flow which leads to overheating of the feedstock.

Particular attention in this design has been paid to preventing stagnation or restriction of flow on the surfaces of the microwave transparent windows. The design of the specific geometry of the treatment chambers prevents hot spots. Hot spots in improperly designed systems result in localized carbonizing of the hydrocarbon feedstock. Conductive carbon buildup on the windows shorts out the microwave field with a catastrophic increase in temperature, resulting in the melting or fracturing of the window material.

Additional protective instrumentation monitors and controls against any flow restrictions in the feedstock path to prevent against voids and flow stagnation and build up of solids. The microwave transmitter is shut down if any fault condition is detected.

All incoming feedstock is preheated by conventional means, and by hot wastewater separated from treated feedstock, to reduce viscosity and to aid in the prefiltration of rocks and other large solid masses from the feedstock emulsion. The inventor has found that microwave energy couples to the feedstock better at elevated temperature. Feed temperatures of 120 to 180 degrees Fahrenheit or more are needed, depending on the melting temperature of organic solids in the mixture as well as the type and amount of entrained non-melting solids such as dirt and sand.

BRIEF DESCRIPTION OF THE DRAWINGS

FIG. 4 is an elevated cross sectional view of the radio frequency microwave applicator window structure.

DETAILED DESCRIPTION OF THE INVENTION

Figure 1:
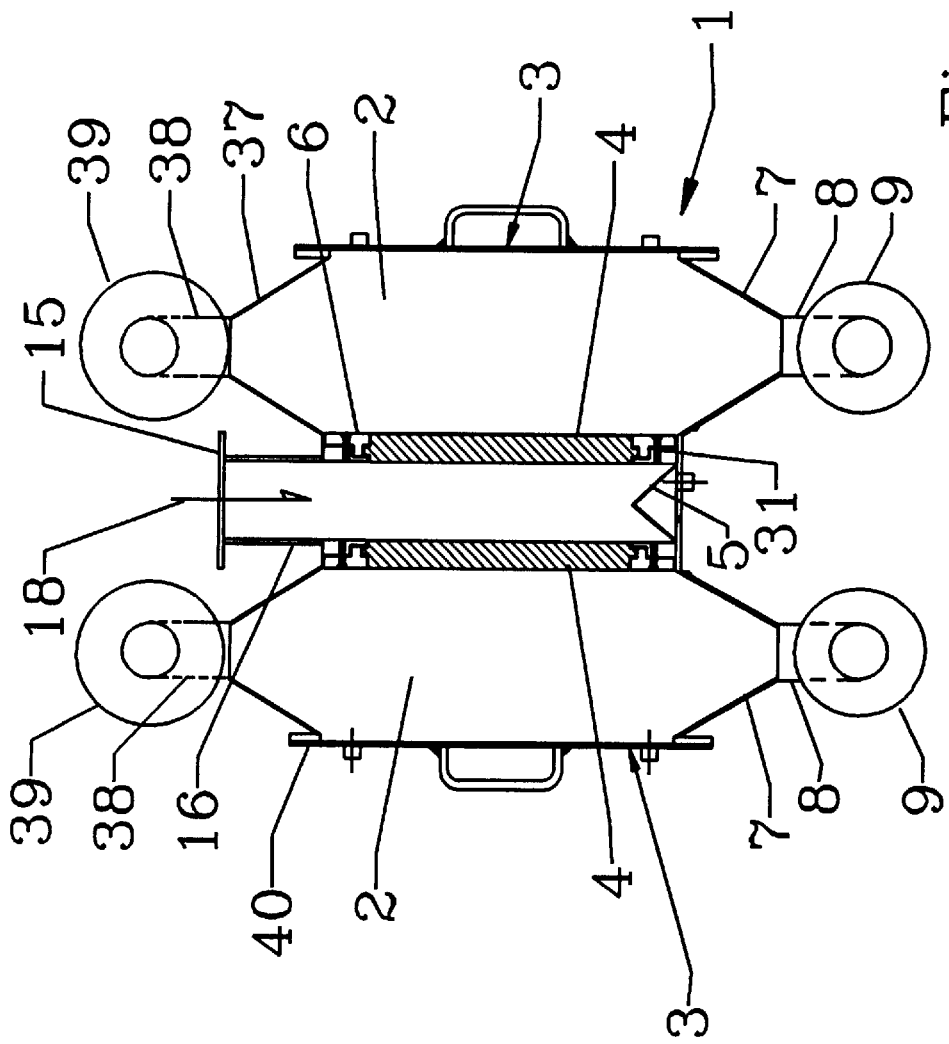
FIG. 1 is a cross sectional elevated view through the microwave applicator and dual processing chambers.

As detailed in FIG. 1, microwave energy 18 is delivered through a hollow waveguide (not shown) which couples to flange 15 of applicator waveguide 16. The microwave energy is divided and deflected to the dual processing chambers by means of angled deflector plate 5. Two plane parallel, microwave transparent windows 4 conduct the microwave energy into dual feedstock process chambers 2 constructed of conductive materials. The dimensions of the process chambers are chosen to maximize a multimode resonant pattern at the working radio frequency and feedstock dielectric characteristics. RF frequencies of 915 Mhz or 2450 Mhz are the frequencies most often used for industrial processing to avoid conflicts with communication devices.

The energy is absorbed by feedstock within the feedstock process chamber 2 in the form of an oil and water emulsion, enters the chamber through inlet pipe 8 and exits through outlet pipe 38. Flanges 9 couple the inlet pipes to a pumped and if necessary, preheated source of filtered feedstock. Connecting flanges 39 couple outlet pipes to the appropriate feedstock handling equipment such as centrifuges and collection tanks. Metal access covers 3 held in place by fasteners attached around the periphery 40 to provide easy means to inspect and clean process chambers if necessary.

The dual process chambers 2 in combination with deflector plate 5 and window frame 6 form a two lobed, multimode resonant reentrant microwave cavity.

Figure 2:
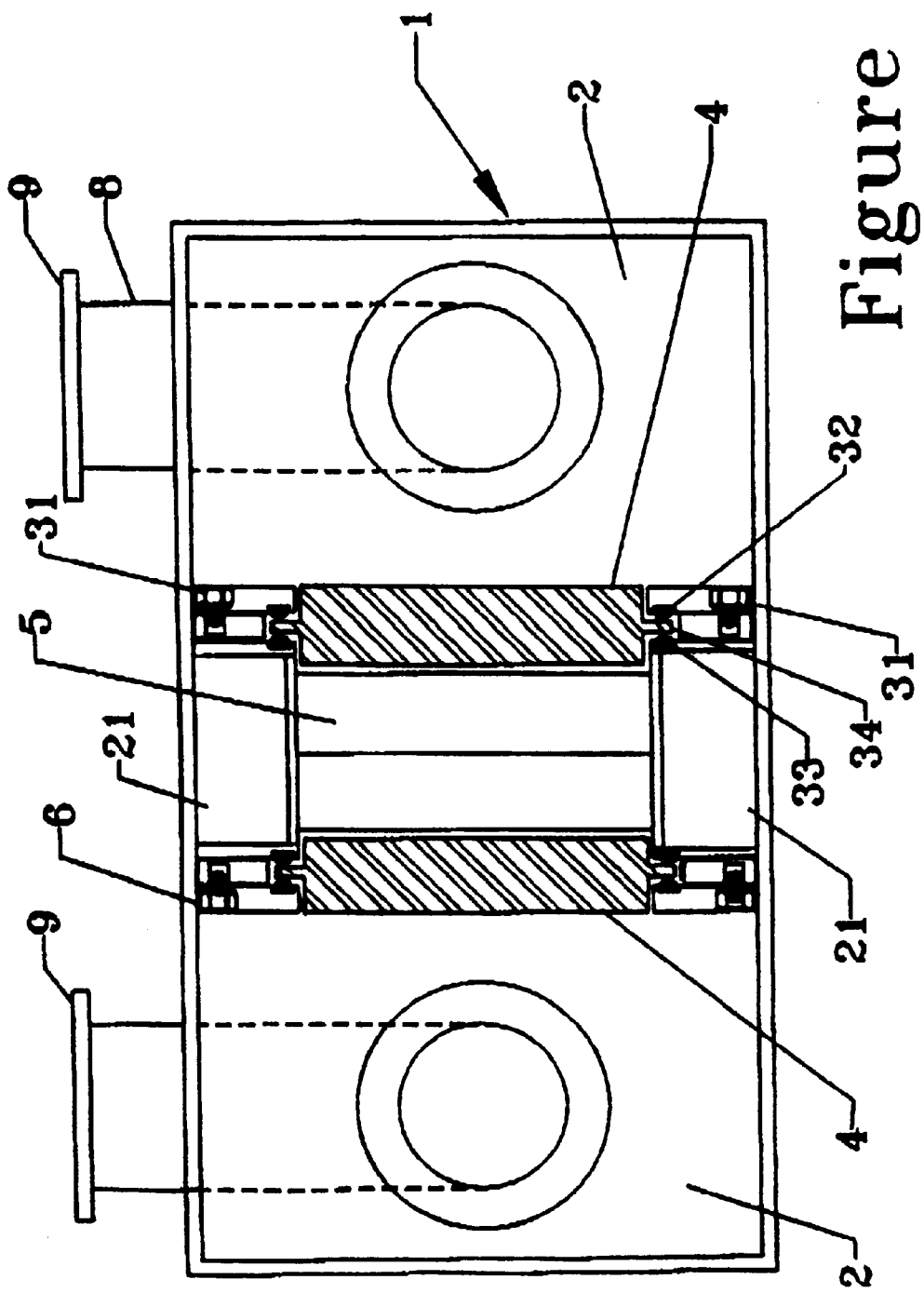
FIG. 2 shows a cross sectional plan view through the microwave applicator and the dual processing chambers.

In FIG. 2, a cross sectional plan view details the applicator placement within the dual lobed process chamber assembly 1. Looking down into the RF energy waveguide, deflector plate 5 reflects the microwave energy through dual parallel microwave transparent windows 4 into the feedstock chambers 2. Multimode resonant microwave patterns between chamber sides, evenly treat the feedstock as it enters the process chamber 2 resulting in a fairly uniform distribution of emulsion breaking energy while raising the feedstock temperature evenly throughout the flow volume. Window retaining hardware, in this embodiment of the invention, consist of a series of threaded fasteners 31 holding window frames 6 securely against hollow bulkheads 21 made from conductive material, such as stainless steel plate. Gaskets 32 and 33 secure the microwave transparent windows 4 against any feedstock leakage into the microwave applicator waveguide. Blind hollow bulkheads 21 serve a structural purpose and restrict the shape of the dual lobed chamber assembly 1 to effective microwave resonance patterns, but do not carry RF energy within the hollow spaces.

Figure 3:
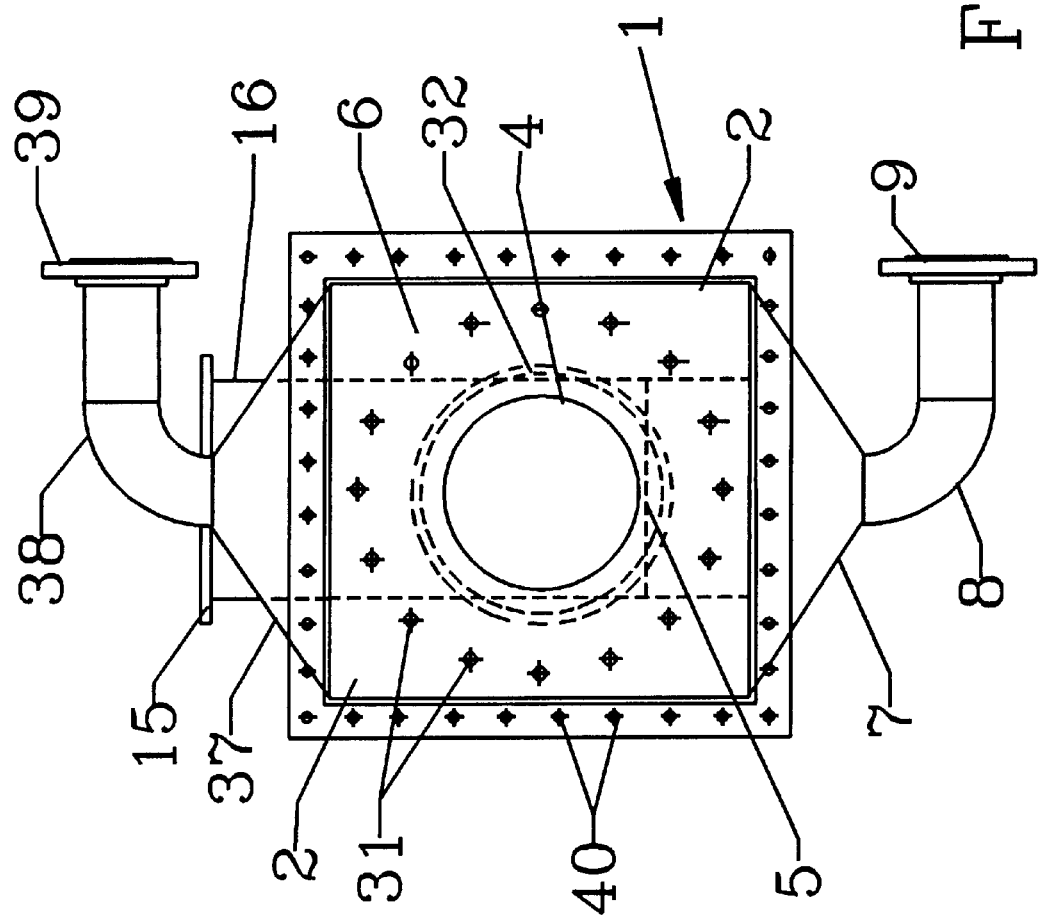
FIG. 3 shows a elevated face view of a microwave window assembly with one process chamber access cover removed.

FIG. 3 details a face view of one of the plane parallel opposed microwave transparent windows. The feedstock process chamber access cover 3 (not shown) has been removed to show the round microwave transparent window 4 secured in place by window frame 6 with multiple fastening holes 31. Gaskets 32 prevent feedstock from leaking into the microwave applicator waveguide 16. Emulsion feedstock enters each of dual feedstock chamber 2 by means of inlet pipe 8 with flange 9 and smooth transition 7 and exits each of the dual feedstock chamber 2 through smooth transition 37 and outlet 38 with connecting flange 39. Though this drawing shows a round microwave transparent window 4, square and rectangular windows can be used.

A cross sectional view of the radio frequency microwave applicator with attention to a preferred method of mounting the microwave transparent windows is detailed in FIG. 4. Radio frequency microwave energy 18 enters the applicator through waveguide 16 and is reflected by angled deflector 5 through thick TEFLON™ (polytetrafluoroethylene) microwave transparent windows 4 into dual feedstock reaction chamber 2. The TEFLON™ or other high temperature, inert fluoropolymer windows are almost transparent to microwaves, inert and impervious to the feedstock mixture and thick enough to withstand the pumping pressures at the elevated temperatures used to treat the feedstock. Window frame 6 is held in place by recessed mounting hardware 31 shown as a threaded fastener presenting a smooth even surface to improve flow characteristics and to prevent entrapment of solids. Gaskets 32 and 33 are shown for completeness, although applicant has found that the compression of the tongue of TEFLON™ 34 around the periphery of the window between waveguide sidewall 35 and window frame 6 is sufficient. Inner wall 36 of the inlet and outlet transitions to the dual treatment chambers have a smooth surface transition with the window frame 6. Solids, waxes and tars cannot build up and char or carbonize to form radio frequency energy, conductive hot spots that would harm the TEFLON™ windows. In addition, the smooth transition between metal surfaces within the dual treatment chambers reduces the number of unnecessary, electrically reactive protrusions which dissipate or reflect radio frequency energy at microwave frequencies.

The accompanying drawings referred to herein are illustrative of the invention but not restrictive thereto, and, together with the description, serve to explain the principles of the invention.

What is claimed is:

1. A method of breaking an oil and water emulsion feedstock into constituent oil and water within a radio frequency (rf) microwave energy absorption applicator path comprising:

a. pumping said feedstock through emulsion feedstock dual process chambers having at least one feedstock inlet and at least one feedstock outlet;

b. directing said radio frequency (rf) microwave energy through a radio frequency microwave waveguide; and c. splitting and deflecting said radio frequency (rf) microwave energy emerging from said radio frequency (rf) microwave waveguide through plane parallel fluoropolymer windows into said emulsion feedstock dual processing chambers with a radio frequency (rf) microwave deflector to raise the emulsion temperature and cause such emulsion to be broken.

2. A method as described in claim 1, in which said feedstock is preheated before entering said at least one emulsion feedstock dual process chamber inlet.

3. A method as described in claim 2, in which said feedstock is filtered before entering said at least one emulsion feedstock dual process chamber inlet.

4. A method of breaking an oil and water emulsion feedstock into constituent oil and water within a radio frequency (rf) microwave energy absorption applicator path comprising:

a. pumping said feedstock through emulsion feedstock dual process chambers having at least one feedstock inlet and at least one feedstock outlet;

b. directing said radio frequency (rf) microwave energy through a radio frequency microwave waveguide; and c. splitting and deflecting said radio frequency (rf) microwave energy emerging from said radio frequency (rf) microwave waveguide through radio frequency transparent windows into said emulsion feedstock dual processing chambers with a radio frequency (rf) microwave deflector to raise the emulsion temperature and cause such emulsion to be broken.

5. A method of breaking an oil and water emulsion feedstock into constituent oil and water comprising:

a. pumping said feedstock through a feedstock process chamber having at least one feedstock inlet and at least one feedstock outlet;

b. exposing said feedstock to radio frequency (rf) energy deflected from a radio frequency waveguide into the feedstock process chamber;

c. monitoring a temperature difference of the feedstock between at least one feedstock inlet and at least one feedstock outlet;

d. controlling the pumping rate of said feedstock through the feedstock process chamber using said monitored temperature difference; said feedstock being optimally retained within said feedstock process chamber to effect maximum emulsion breakage.

6. The method of claim 5 wherein two streams of the emulsion feedstock are pumped through dual opposing process chambers adjacent a central microwave waveguide.

7. The method of claim 6 wherein the flow of the feedstock is upward through the process chamber.

8. The method of claim 5 wherein the temperature difference is monitored by measuring the temperature at the inlet and outlet of the process chamber.

9. The method of claim 5 wherein the feedstock emulsion is preheated to liquify waxes which may be present.

10. The method of claim 9 wherein the feed temperature is from 120° F. to about 180° F.

11. The method of claim 9 wherein the heated feedstock is filtered to remove solids remaining.

* * * * *